2,856,307

DEXTRIN STARCH PASTE AND PROCESS OF MAKING IT

Ralph E. C. Fredrickson, Decatur, Ill., assignor to A. E. Staley Manufacturing Company, Decatur, Ill., a corporation of Delaware No Drawing. Application January 12, 1955
Serial No. 481,480

4 Claims. (Cl. 106—208)

This invention relates, generally, to improvements and innovations in starch and dextrin pastes, and it has particular relation to the use of raw or unmodified native starch to reduce or prevent "set-back" of dextrin pastes.

Dextrins, particularly dextrins derived from corn starch by heating it under certain conditions, constitute one of the most important industrial adhesives. In the neighborhood of 200,000,000 pounds of dextrins are consumed in a single year in this country. Dextrins are primarily classified as white dextrins, canary dextrins and British gums. In addition to these primary classifications, there are a number of special types of dextrins available. Large quantities of raw starch itself are also used for adhesives. While dextrins are more expensive than raw starch, they have certain advantages over starch itself, the primary advantages being lower viscosity and increased tack. Whereas raw or unmodified native starch is not soluble in water to an appreciable degree at ordinary room temperatures, dextrins, depending upon the degree of conversion, have solubilities ranging up to approximately 100%.

Both dextrin adhesives and raw starch adhesives, or pastes as they are often called, are subject to a common serious shortcoming which is referred to in the art as "set-back" or "paste back." These expressions refer to the property which such pastes exhibit of increasing in viscosity on standing. This tendency and characteristic property of starch and dextrin pastes gives rise to difficulties in their industrial application and prevents these starch materials from being used on an even larger scale as industrial adhesives. Thus, adhesives are usually applied industrially by machines of various types, e. g. envelope machines. For high-speed operation these machines must be set and adjusted with considerable accuracy based on the properties of the adhesive. As the viscosity of a starch or dextrin paste increases, the machines are in effect thrown out of adjustment to a degree depending primarily upon the extent of increase and variation in paste viscosity. Sometimes, the viscosity of a starch or dextrin paste will increase to the point where the paste actually gels. For these reasons, it is generally considered necessary to make starch and dextrin pastes in small batches which may be consumed before viscosity increase, i. e. set-back becomes serious.

There have been numerous attempts to inhibit set-back in starch and dextrin pastes, usually by the addition of some chemical to the pastes. Certain commercial preparations of such a nature are available. However, they are relatively expensive and add foreign substances to the pastes. Furthermore, none of these special preparations is entirely satisfactory in preventing or minimizing set-back.

Starch base pastes vary enormously in their set-back characteristics. Pastes prepared from raw starch are the worst in respect to this property, chlorinated starches are the best, and pastes prepared from dextrins are intermediate.

The tendency of a dextrin to exhibit set-back generally, decreases as the solubility increases. With respect to dextrins having approximately the same solubility, set-back is generally more pronounced in pastes having higher initial viscosities than in those having lower viscosities, at a particular dextrin concentration. In order to achieve acceptable set-back properties in the higher viscosity dextrin pastes, long conversion times and high roasting temperatures are required with the result that the products are consequently costly to manufacture.

While dextrin pastes constitute one type of starch pastes, dextrins are classified separately, have their own distinctive properties and are separately employed. Raw starch and dextrin are not used together to make pastes or adhesives. However, it was unexpectedly discovered in accordance with the present invention that raw starch could be used very successfully to inhibit and even prevent set-back in dextrin pastes. Viewed from the reverse standpoint, it may also be said that it was found in accordance with the invention that dextrins could be used to inhibit or even prevent set-back in raw starch pastes. It is not believed that this use of raw starch and/or dextrin was previously known, or described in the literature and, of course, it is entirely contrary to what would logically be expected in view of the well-known tendency of raw starch pastes to set-back or gel even more than dextrin pastes.

It was further found that the viscosity stabilizing effect of raw starch on dextrin pastes is destroyed if the starch is subjected to even mild dextrinizing conditions. Thus, if raw starch is dextrinized to a solubility of as low as 10–15%, it no longer has the property of stabilizing the viscosity or inhibiting set-back of a dextrin paste. In fact, the addition of such 10–15% soluble dextrin to an 85% soluble dextrin results in a mixture having poorer viscosity stability (i. e. greater tendency to set-back) than the 85% soluble dextrin alone.

The stabilizing effect of raw starch on the viscosity dextrin pastes occurs within wide limits of the ratio of the starch to dextrin, the higher the ratio the greater being the degree of stabilization. Raw starch will also stabilize the viscosities of borated dextrin pastes as well as unborated dextrin pastes. While significant improvement is obtained when the ratio of starch to dextrin paste is so small that the viscosity of the starch-dextrin paste is approximately equal to the viscosity of a dextrin paste of the same dextrin content alone, the stability will be better if the ratio is high enough to give a paste viscosity several times greater than the viscosity of the dextrin alone.

It has been found that raw starch may be used not only to stabilize the viscosity of dextrin pastes which initially have good or high viscosity characteristics, but that raw starch may be added to a low viscosity dextrin (which is relatively cheap) in such amounts as to produce a starch-dextrin paste having a viscosity comparable with that of the more expensive dextrins. Such starch-enriched dextrin pastes will have excellent viscosity stability and freedom from set-back. For example, it has been found that an inexpensive, low viscosity dextrin of, say, 95–100% solubility, may have its viscosity built up by the addition of up to 60% starch based on the dextrin content, so as to provide a paste having high initial viscosity with excellent resistance to set-back.

When raw starch is used primarily to prevent set-back of dextrin pastes and not to also increase viscosity, a moderate amount (e. g. from 5 to 25%) of the dextrin-starch dry substance will suffice. When the raw starch is used to substantially increase the viscosity of dextrin pastes in an economical manner and at the same time impart excellent set-back characteristics, larger amounts are used up to 50% of the dextrin-starch dry substance.

The object of the present invention, generally stated, is the use of raw starch to improve the viscosity stability properties or so-called "set-back" properties of dextrin pastes. Since in certain instances considerable percentages of raw starch may be used, this object could also be otherwise stated as the use of dextrins to improve the viscosity stability or set-back properties of raw starch pastes.

An important object of the invention is the use of raw starch to materially improve or inhibit the set-back of a dextrin paste without materially increasing or altering the viscosity thereof.

Another object of the invention is the use of raw starch to greatly increase the viscosity of dextrin pastes of normally low viscosity in an economical manner by the use of relatively large amounts of inexpensive raw starch, at the same time providing a paste which has excellent set-back resistance.

Certain other objects of the invention will, in part, be obvious and will, in part, appear hereinafter.

For a more complete understanding of the nature and scope of the invention, reference may now be had to the following detailed description thereof wherein the illustrative examples will serve to amplify and further bring out the nature of the invention.

EXAMPLE 1

The three following mixtures were prepared and each was heated to 180° F. on a steam bath and then cooked at this temperature for an additional 30 minutes. Water was added back to each sample to compensate for evaporation loss and the samples were then cooled to room temperature:

|  | A (Control) | B | C |
| --- | --- | --- | --- |
| Grams Canary Dextrin | 400 | 396 | 380 |
| Grams Raw Starch | 0 | 4 | 20 |
| Grams Water | 300 | 300 | 300 |

After cooling to room temperature, the paste viscosities of each sample were immediately measured with the Brookfield viscosimeter and the measurements repeated at intervals over a 30 day period with results shown in the following table:

*Effect of raw starch on set-black of canary dextrin pastes*

| Sample | A (Control) | B | C |
| --- | --- | --- | --- |
| Percent Starch (Dry Substance Basis) | 0 | 1 | 5 |
| Initial Visc. Centipoises | 2,480 | 2,820 | 2,440 |
| Final Visc. after 30 Days | 4,200 | 4,970 | 3,850 |
| Ratio Final Visc./Initial Visc. | 1.69 | 1.76 | 1.58 |

While up to 5% starch had no significant effect on viscosity, it did appreciably decrease the set-back of a dextrin which itself had excellent resistance to set-back.

EXAMPLE 2

This example serves to show the effect of raw starch on dextrin pastes made from a dextrin which itself has poor set-back resistance. Five samples of pastes were prepared and the viscosities tested in accordance with the procedure described above under Example 1. The following table gives the composition of the various samples and the results of the viscosity determinations that were made:

*Effect of starch on set-back of canary dextrin having poor set-back resistance*

| Sample | A (Control) | A | B | C | D |
| --- | --- | --- | --- | --- | --- |
| Grams Dextrin (D782) | 400 | 300 | 275 | 250 | 200 |
| Grams Starch | 0 | 100 | 125 | 150 | 200 |
| Grams Water | 300 | 300 | 300 | 300 | 300 |
| Percent Starch (D. S. B.) | 0 | 25 | 31.5 | 37.5 | 50 |
| Initial Visc., cps | 6,350 | 6,870 | 11,840 | 21,750 | Too Thick |
| Visc. After: | | | | | |
| 1 Day | 11,100 | 8,200 | 11,200 | 22,000 | |
| 2 Days | 23,600 | 9,400 | 11,000 | 20,600 | |
| 4 Days | 75,000 | 10,900 | 10,200 | 21,800 | |
| 7 Days | Gel | 19,500 | 16,200 | 28,000 | |
| 30 Days | | 36,500 | 24,000 | 33,500 | |
| Ratio: Final Visc./Initial Visc. | Inf. | 5.32 | 2.02 | 1.54 | |

It will be seen that whereas the dextrin alone, i. e. sample A, gels within 7 days, none of the mixtures of raw starch and dextrin gelled, and the higher the ratio of starch to dextrin, the better the set-back resistance.

Referring to sample B, it will be noted that the initial viscosity of this sample was of the same order as for the control. However, the viscosity stability of sample B was much better than that of the control. Thus, it was possible to improve substantially the set-back resistance of the dextrin with an amount of raw starch that gave a mixture viscosity in the vicinity of that of the dextrin alone. Referring to samples C and D, it will be seen that it was possible to increase the initial viscosities very substantially and at the same time obtain excellent set-back resistance.

Many dextrins are used in combination with borax (sometimes called borated dextrins). It is also desirable that these have good set-back properties. The following example shows the results obtained when the present invention was applied to a borated dextrin of 85% solubility:

EXAMPLE 3

Five paste samples were prepared and their viscosities tested in accordance with the procedure described above under Example 1 with the results shown in the following table:

*Effect of starch on set-back of borated dextrin of 85% solubility*

| Experiment | A (Control) | B | C | D |
| --- | --- | --- | --- | --- |
| Grams Dextrin (D714) | 200 | 180 | 170 | 160 |
| Grams Starch | 0 | 20 | 34 | 40 |
| Grams Borax (65% $Na_2B_4O_7$) | 30 | 30 | 30 | 30 |
| Grams Water | 300 | 300 | 300 | 300 |
| Initial Viscosity | 526 | 740 | 1,390 | 6,750 |
| Viscosity 30 Days | 2,640 | 1,380 | 2,104 | 9,440 |
| Ratio: 30 Days/Initial | 5.02 | 1.87 | 1.51 | 1.4 |
| Viscosity 60 Days | 23,600 | 5,900 | 4,500 | 14,800 |
| Ratio: 60 Days/Initial | 45.0 | 8.0 | 3.24 | 2.2 |
| Viscosity 90 Days | Gel | 13,600 | 6,500 | 20,600 |
| Ratio: 90 Days/Initial | Inf. | 18.4 | 4.68 | 3.06 |
| Viscosity 104 Days | | 21,400 | 8,500 | 23,200 |
| Ratio: 104 Days/Initial | Inf. | 29.0 | 6.1 | 3.45 |

Thus, raw starch was also effective in reducing the set-back of borated dextrin even when present in an amount sufficient to give an initial viscosity 20 times greater than the dextrin alone (sample E). Therefore, it is possible to build up enormously the viscosity of a borated dextrin simply by adding enough raw starch to it. Unexpectedly, such a high viscosity paste had less set-back than either the starch or dextrin alone.

The following example serves to show that the ability of raw starch to improve the viscosity characteristics of dextrin is removed by even slight dextrinization, and that therefore, raw starch is peculiarly effective in its action.

EXAMPLE 4

Three samples were prepared according to the procedure described in Example 1 and the viscosities measured with the Brookfield viscometer with the results shown in the following table:

*Effect of a 10% soluble dextrin on set-back of borated dextrin of 85% solubility*

| Experiment | A (Control) | B | C |
|---|---|---|---|
| Grams D713 (85% Sol.) | 200 | 175 | 150 |
| Grams Dextrin #10 (10% Sol.) | 0 | 25 | 50 |
| Grams Borax (65% $Na_2B_4O_7$) | 30 | 30 | 30 |
| Grams Water | 300 | 300 | 300 |
| Initial Viscosity | 456 | 618 | 1,702 |
| Viscosity After 30 Days | 2,960 | 9,120 | 34,000 |
| Ratio: Final/Initial | 6.5 | 14.7 | 20.0 |

It will be seen that sample B had poorer set-back resistance than the 85% dextrin alone (i. e. the control), and that set-back became worse as the proportion of #10 dextrin increased as shown by sample C. Thus, the results obtained with a 10% soluble dextrin were just the reverse of those obtained with raw starch (e. g. Example 3).

While it is generally known by those skilled in the art that raw starch itself has very poor set-back or viscosity stability properties, this fact is brought out quantitatively in the two following tables. Each sample was prepared by heating the starch-water mixture to 180° F. on a steam bath and then allowed to cool. Viscosities were then measured with the Brookfield Viscosimeter first at the temperatures indicated and then at the times indicated measured after the samples had cooled to 75° F.

*Table A (raw starch)*

[Starch Conc.]

| 3% | | 5% | | 7% | |
|---|---|---|---|---|---|
| Temp. | Visc., cps. | Temp. | Visc., cps. | Temp. | Visc., cps. |
| 180° F | 112 | 168° F | 1,900 | 185° F | 6,500 |
| 135° F | 208 | 138° F | 2,735 | 140° F | 21,750 |
| 110° F | 256 | 110° F | 3,200 | 75° F | 82,000 |
| 75° F | 310 | 75° F | 3,980 | | |
| Time | | Time | | Time | |
| 3½ hrs | 350 | 4⅓ hrs | 18,000 | 2 hrs | Gelled. |
| 4¾ hrs | 380 | 5⅔ hrs | Gelled. | | |
| 1 day | 1,340 | | | | |
| 2 days | 1,380 | | | | |
| 4 days | 1,380 | | | | |
| 19 days [1] | 1,400 | | | | |
| 26 days | 4,450 | | | | |

[1] Paste broke down.

*Table B (borated starch—10% borax)*

[Borated Starch Conc.]

| 3% | | 3.5% | | 5% | |
|---|---|---|---|---|---|
| Temp. | Visc., cps. | Temp. | Visc., cps. | Temp. | Visc., cps. |
| 185° F | 290 | 189° F | 565 | 190° F | 3,000 |
| 134° F | 555 | 130° F | 1,065 | 125° F | 23,500 |
| 103° F | 975 | 110° F | 1,550 | 80° F | 60,000 |
| 75° F | 1,575 | 100° F | 1,860 | | |
| | | 75° F | 3,075 | | |
| Time | | Time | | Time | |
| 6½ hrs | 1,650 | | | ¾ hr | Gelled. |
| 1 day | 1,825 | 5 hrs | 3,200 | | |
| 4 days | 2,750 | 1 day | 7,250 | | |
| 19 days | 3,075 | 4 days | 8,000 | | |
| | | 26 days | 7,500 | | |

Referring to Table A above, it will be noted that the viscosity of the 3% starch paste, which had the very low initial viscosity of 310 centipoises at 75° F., increased by a factor of 4.35 after one day and then remained fairly constant for 19 days until the paste broke down. However, as the starch concentrations increased, set-back became much worse. Thus, the 5% paste gelled five and two-thirds hours after cooling to 75° F. and the 7% paste gelled in two hours. Comparing the results set forth in Table A above with those set forth in the table under Example 2 above, it will be seen that whereas set-back resistance becomes increasingly poor at a very rapid rate in the case of starch pastes alone, just the reverse effect occurs when the percentage of raw starch is increased in starch-dextrin mixtures. Thus, the effect of starch concentration on the set-back resistance of starch paste is just the opposite of the effect of starch concentration on the set-back resistance of starch-dextrin pastes.

Referring further to Table A above and the table in Example 2 above for a comparison of starch pastes and starch-dextrin pastes having initial viscosities of the same order of magnitude, it will be seen that sample B in Example 2 had an initial viscosity of 6870 centipoises at room temperature and this increased by a factor of 5.32 in 30 days. Referring to Table A, the 5% starch pastes had an initial viscosity of only 3980 centipoises and gelled in five and two-thirds hours and the 7% paste which had an initial viscosity of 82,000 centipoises gelled in less than two hours. Thus, the starch paste having 5% starch content and a somewhat lower viscosity than the starch-dextrin paste sample B in Example 2, had much poorer set-back resistance. On the basis of Table A above a starch paste having a starch content between 5 and 7% and an initial viscosity of 6870 centipoises, would have had even worse set-back resistance than the 5% paste.

It is also interesting to compare the set-back properties of starch pastes with those of starch-dextrin pastes having the same starch-to-water ratios. Referring to sample C under Example 1 above, the starch-to-water ratio for this example is 20:300 or 6⅔%. This particular starch-dextrin mixture had a set-back ratio of 1.58 in 30 days. On the other hand, the 7% starch paste in Table A above having approximately the same starch-to-water ratio gelled in less than two hours.

Comparing the starch and starch-dextrin pastes from the standpoint of starch concentration as a percent of a total paste mixture by weight, it will be seen that sample C in Example 1 contains 2.5% of starch by weight on the basis of the total weight of the paste including the water. This starch-dextrin mixture had a set-back ratio of 1.58 in 30 days as mentioned above whereas the 3% starch paste in Table A above had a set-back ratio of 4.35 in 24 hours.

Accordingly, whatever basis of comparison is used, the set-back resistance of starch-dextrin pastes is very much better than that of starch pastes alone. Summarizing, set-back of starch pastes increases rapidly as the starch concentration increases whereas in starch-dextrin pastes just the reverse occurs, i. e. as the starch concentration in the mixture increases, set-back decreases (i. e. improves). Further, it is apparent that at similar paste viscosities, starch-dextrin pastes have much lower set-back than do starch pastes alone.

The foregoing comparisons and generalizations between pastes containing raw starch also hold for pastes containing borated starches. Such comparisons may be made from Table B above and the tables contained in Example 3.

In order to obtain the benefits of the present invention, a minimum of 5% (d. s. b.) of raw starch is required in a starch-dextrin paste and the concentration of starch may be increased until the initial viscosity becomes excessive.

It will be understood that in addition to raw starch and dextrin or borated dextrin, other ingredients may be present such as known preservatives, dyes, perfumes, and flavors.

Having fully described the invention and set forth examples illustrating preferred embodiments thereof, what is claimed as new is:

1. A dextrin paste containing at least 5% by weight of raw starch on a dry substance basis and consisting essentially of dextrin, raw starch and water.

2. A borated dextrin paste containing at least 5% by weight of raw starch on a dry substance basis and the adhesive ingredients of which consist of dextrin, raw starch, borax, and water.

3. The method of improving the viscosity stability of a dextrin paste which comprises incorporating therein at least 5% by weight of raw starch on a dry substance basis said dextrin paste consisting essentially of dextrin, raw starch and water.

4. The method of improving the viscosity stability of a borated dextrin paste which comprises incorporating therein at least 5% by weight of raw starch on a dry substance basis, the adhesive ingredients of said dextrin paste consisting of dextrin, raw starch, borax, and water.

References Cited in the file of this patent

UNITED STATES PATENTS

| | | |
|---|---|---|
| 2,477,912 | Vallandigham | Aug. 2, 1949 |

FOREIGN PATENTS

| | | |
|---|---|---|
| 597,747 | France | Nov. 27, 1925 |
| 7,344 | Great Britain | 1901 |

OTHER REFERENCES

Kerr: "Chemistry and Industry of Starch" 1944, pp. 58, 446 and 447.